(12) United States Patent
Harmon et al.

(10) Patent No.: US 11,453,317 B2
(45) Date of Patent: Sep. 27, 2022

(54) VEHICLE SEATING SYSTEM

(71) Applicant: Ford Global Technologies, LLC, Dearborn, MI (US)

(72) Inventors: Michael John Harmon, Westland, MI (US); Arnav Wagh, Detroit, MI (US); Gabriella M. G. Jacobsen, Ferndale, MI (US); Carlos Gonzales, Berkley, MI (US); Michael Huskey, Farmington, MI (US); David Vondle, Chicago, IL (US); Jevon Gerweck, Monroe, MI (US); Daveanand M. Singh, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/063,827

(22) Filed: Oct. 6, 2020

(65) Prior Publication Data
US 2022/0105873 A1 Apr. 7, 2022

(51) Int. Cl.
*B60N 2/30* (2006.01)
*B60R 7/04* (2006.01)

(52) U.S. Cl.
CPC .............. *B60N 2/305* (2013.01); *B60R 7/043* (2013.01); *B60N 2205/35* (2013.01)

(58) Field of Classification Search
CPC ...... B60N 2/305; B60N 2205/35; B60R 7/043
See application file for complete search history.

(56) References Cited

U.S. PATENT DOCUMENTS

| | | | | |
|---|---|---|---|---|
| 4,475,763 | A * | 10/1984 | Hamatani | B60N 2/3013 296/65.09 |
| 5,558,386 | A * | 9/1996 | Tilly | B60N 2/305 292/111 |
| 6,074,000 | A | 6/2000 | Wagner | |
| 6,179,362 | B1 * | 1/2001 | Wisniewski | B60N 2/3011 296/65.01 |
| 6,540,279 | B1 | 4/2003 | Bargiel | |
| 6,824,029 | B2 | 11/2004 | Tuel, Jr. | |
| 6,877,807 | B2 * | 4/2005 | Mizuno | B60N 2/305 297/188.1 |
| 7,121,606 | B2 * | 10/2006 | Khan | B60R 7/043 296/37.15 |
| 7,318,616 | B1 | 1/2008 | Bradley | |
| 8,770,661 | B2 * | 7/2014 | Kalergis | B60R 7/043 297/188.1 |
| 9,062,706 | B2 * | 6/2015 | Hirokawa | B60N 2/366 |

(Continued)

*Primary Examiner* — David R Dunn
*Assistant Examiner* — Tania Abraham
(74) *Attorney, Agent, or Firm* — Vichit Chea; Price Heneveld LLP

(57) ABSTRACT

A seating system for a vehicle is disclosed herein. The seating system includes a first seating assembly having a first seat base pivotable between use and pivoted positions. A second seating assembly is adjacent to the first seating assembly and includes a second seat base that is pivotable between use and pivoted positions. The first and second seat bases are operable between interdependent conditions, wherein movement of the first seat base between the use and pivoted positions causes the second seat base to move between the use and pivoted positions, and independent conditions, wherein the first seat base is operable to move between the use and pivoted positions independently of the second seat base.

14 Claims, 6 Drawing Sheets

(56) References Cited

U.S. PATENT DOCUMENTS

| | | | |
|---|---|---|---|
| 9,950,674 B1* | 4/2018 | Kalergis | B60N 2/305 |
| 2002/0005649 A1 | 1/2002 | Hofmann | |
| 2009/0115229 A1 | 5/2009 | Messner | |
| 2016/0107546 A1* | 4/2016 | Barzen | B60N 2/2245 297/378.12 |
| 2017/0106773 A1* | 4/2017 | Aguilar Ruelas | B60R 7/043 |
| 2017/0282754 A1* | 10/2017 | Zouzal | B60N 2/305 |
| 2019/0248254 A1* | 8/2019 | Uno | B60N 2/3011 |
| 2019/0351798 A1* | 11/2019 | Bhatia | B60N 2/4263 |

* cited by examiner

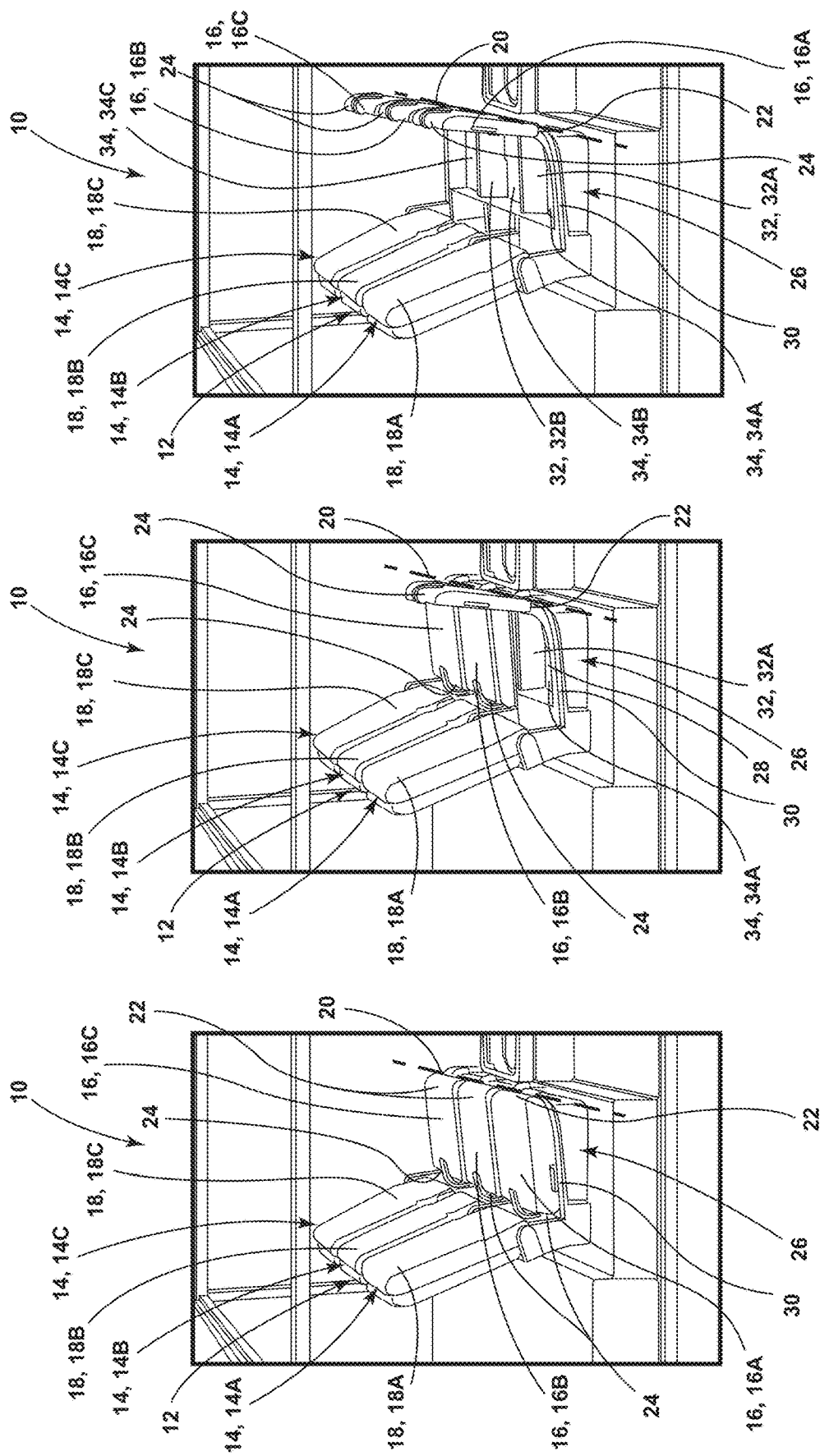

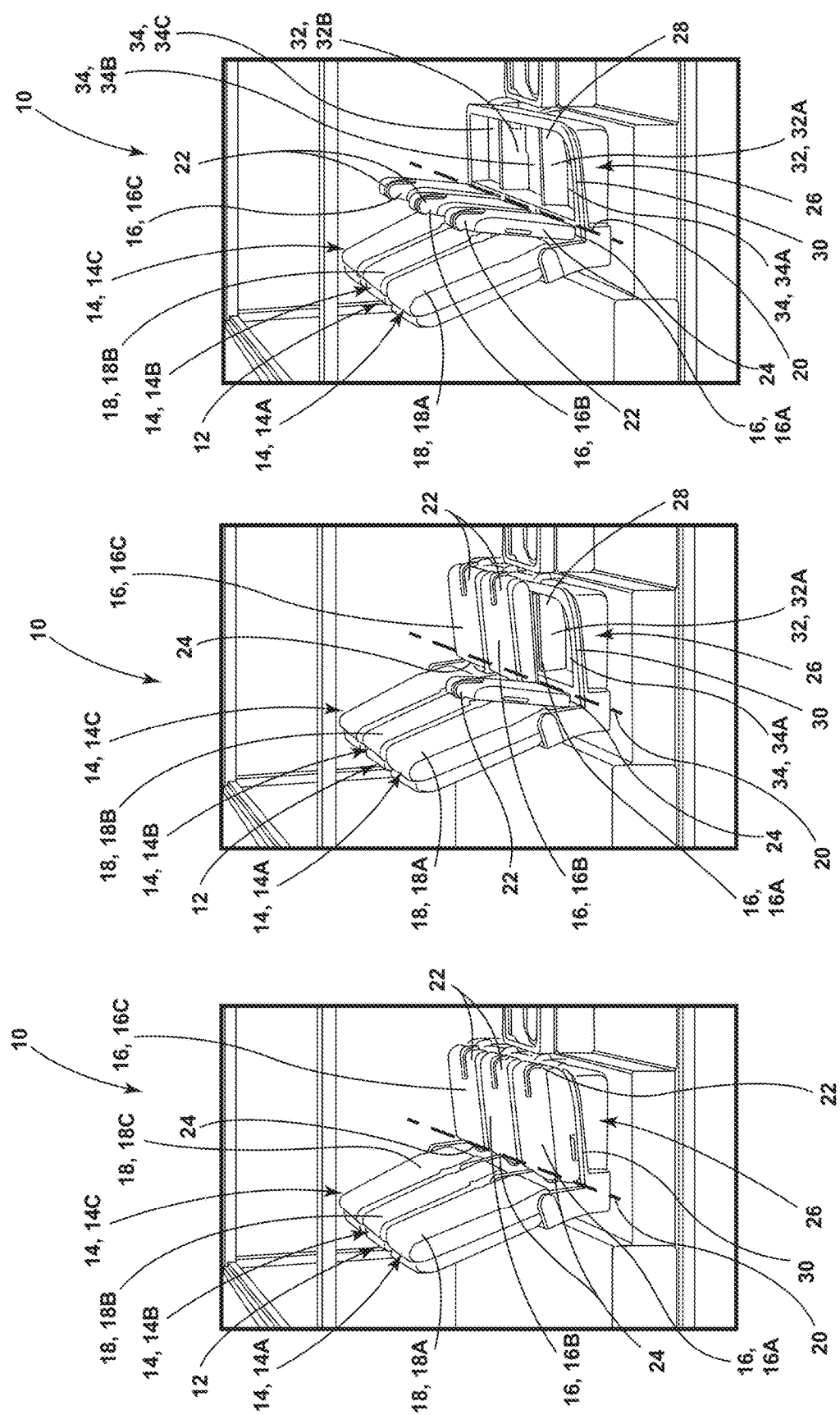

VEHICLE SEATING SYSTEM

FIELD OF THE DISCLOSURE

The present disclosure generally relates to a seating system for a vehicle. More specifically, the present disclosure relates to selectively interconnectable pivoting seat bases.

BACKGROUND OF THE DISCLOSURE

Bench-style vehicle seating assemblies often include a seat base that is operable to pivot between positions. A plurality of selectively interconnectable, pivoting seat bases may be desired.

SUMMARY OF THE DISCLOSURE

According to a first aspect of the present disclosure, a vehicle seating system includes a first seating assembly having a first seat base operable to pivot between a use position and a pivoted position. A second seating assembly is adjacent to the first seating assembly and includes a second seat base that is operable to pivot between a use position and a pivoted position. A connector is coupled to at least one of the first seat base and the second seat base and is operable between an engaged condition, wherein the connector couples the first and second seat bases, such that movement of the first seat base from the use position to the pivoted position causes the second seat base to move from the use position to the pivoted position, and a disengaged condition. In the disengaged condition, the first seat base is operable to move independently of the second seat base between the use and pivoted positions.

Embodiments of the first aspect of the present disclosure may include any one or a combination of the following features:
- the first seat base comprises a rearward end that is proximate to a seatback of the first seating assembly in the use position of the first seat base, and a forward end opposite the rearward end, wherein the first seat base is configured to pivot between the use and pivoted positions about a pivot axis that is proximate to the forward end of the first seat base;
- the first seat base comprises a rearward end that is proximate to a seatback of the first seating assembly, and a forward end opposite the rearward end, wherein the first seat base is configured to pivot between the use and pivoted positions about a pivot axis that is proximate to the rearward end of the first seat base;
- the connector is pivotably coupled to the first seat base and configured to be pivoted between the engaged condition and the disengaged condition;
- a storage receptacle disposed vehicle-downward of the first seat base, wherein movement of the first seat base from the use position to the pivoted position provides access to the storage receptacle;
- the storage receptacle extends beneath the second seat base, such that movement of the second seat base from the use position to the pivoted position provides access to the storage receptacle; and
- an actuator coupled to the connector, and a controller coupled to the actuator and configured to prompt actuation of the actuator in response to receiving an input from an input feature to move the connector to the engaged condition.

According to a second aspect of the present disclosure, a vehicle seating system includes a first seating assembly having a first seat base operable to pivot between a use position and a pivoted position. A second seating assembly is adjacent to the first seating assembly and includes a second seat base operable to pivot between a use position and a pivoted position. A third seating assembly is adjacent to the second seating assembly, such that the second seating assembly is positioned between the first and third seating assemblies. The third seating assembly includes a third seat base that is operable to pivot between a use position and a pivoted position. A first connector is coupled to at least one of the first seat base and the second seat base and is operable between an engaged condition, wherein the first connector couples the first and second seat bases, such that movement of the first seat base from the use position to the pivoted position causes the second seat base to move from the use position to the pivoted position, and a disengaged condition. In the disengaged condition, the first seat base is operable to move independently of the second seat base between the use and pivoted positions. A second connector is coupled to at least one of the second seat base and the third seat base and is operable between an engaged condition, wherein the second connector couples the second and third seat bases, such that movement of the third seat base from the use position to the pivoted position causes the second seat base to move from the use position to the pivoted position, and a disengaged condition. In the disengaged condition, the third seat base is operable to move independently of the second seat base between the use and pivoted positions.

Embodiments of the second aspect of the present disclosure may include any one or a combination of the following features:
- the first, second, and third seat bases are configured to pivot about first, second, and third pivot axes, respectively, wherein the first, second, and third pivot axes are substantially collinear;
- the first seat base comprises a rearward end that is proximate to a seatback of the first seating assembly in the use position of the first seat base, and a forward end opposite the rearward end, wherein the first pivot axis is proximate to the forward end of the first seat base, such that the first seat base is configured to pivot vehicle-forward from the use position to the pivoted position;
- the first seat base comprises a rearward end that is proximate to a seatback of the first seating assembly, and a forward end opposite the rearward end, wherein the first pivot axis is proximate to the rearward end of the first seat base, such that the first seat base is configured to pivot vehicle-rearward from the use position to the pivoted position;
- the first connector is pivotably coupled to an underside of the first seat base and configured to be pivoted between the engaged condition and the disengaged condition;
- the second connector is pivotably coupled to an underside of the second seat base and configured to be pivoted between the engaged condition and the disengaged condition;
- a storage receptacle disposed vehicle-downward of the first seat base, wherein movement of the first seat base from the use position to the pivoted position provides access to the storage receptacle;
- the storage receptacle extends beneath the second and third seat bases, such that movement of the second seat base from the use position to the pivoted position provides access to the storage receptacle, and movement of the third seat base from the use position to the pivoted position provides access to the storage receptacle; and at least one actuator coupled to the first and second connectors, and a controller coupled to the at least one actuator and configured to prompt actuation of the at least one actuator in response to receiving at least one input from at least one input feature to move at least one of the first connector and the second connector to the engaged condition.

According to a third aspect of the present disclosure, a seating system includes a first seating assembly having a first seat base pivotable between use and pivoted positions. A second seating assembly is adjacent to the first seating assembly and includes a second seat base that is pivotable between use and pivoted positions. The first and second seat bases are operable between interdependent conditions, wherein movement of the first seat base between the use and pivoted positions causes the second seat base to move between the use and pivoted positions, and independent conditions, wherein the first seat base is operable to move between the use and pivoted positions independently of the second seat base.

Embodiments of the third aspect of the present disclosure may include any one or a combination of the following features:

a connector coupled to at least one of the first and second seat bases and operable between an engaged condition, wherein the connector couples the first and second seat bases, such that the first and second seat bases are in the interdependent conditions, and a disengaged condition, wherein the first and second seat bases are in the independent conditions;

a seatback coupled to the first and second seat bases and configured to provide a backrest for an occupant seated on the first seat base and an occupant seated on the second seat base; and a storage receptacle disposed vehicle-downward of the first and second seat bases, wherein movement of at least one of the first and second seat bases from the use position to the pivoted position provides access to the storage receptacle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 2A is a perspective view of first, second, and third seating assemblies, illustrating first, second, and third seat bases in use positions, according to one embodiment;

FIG. 2B is a perspective view of the first, second, and third seating assemblies, illustrating the first seat base in a pivoted position and the second and third seat bases in the use positions, according to one embodiment;

FIG. 2C is a perspective view of the first, second, and third seating assemblies, illustrating the first, second, and third seat bases in pivoted positions, according to one embodiment;

FIG. 3A is a perspective view of the first, second, and third seating assemblies, illustrating the first, second, and third seat bases in use positions, according to one embodiment;

FIG. 3B is a perspective view of the first, second, and third seating assemblies, illustrating the first seat base pivoted rearward to the pivoted position and the second and third seat bases in the use positions, according to one embodiment;

FIG. 3C is a perspective view of the first, second, and third seating assemblies, illustrating the first, second, and third seat bases pivoted rearward to pivoted positions, according to one embodiment;

DETAILED DESCRIPTION OF THE PREFERRED EMBODIMENTS

Figure 1:
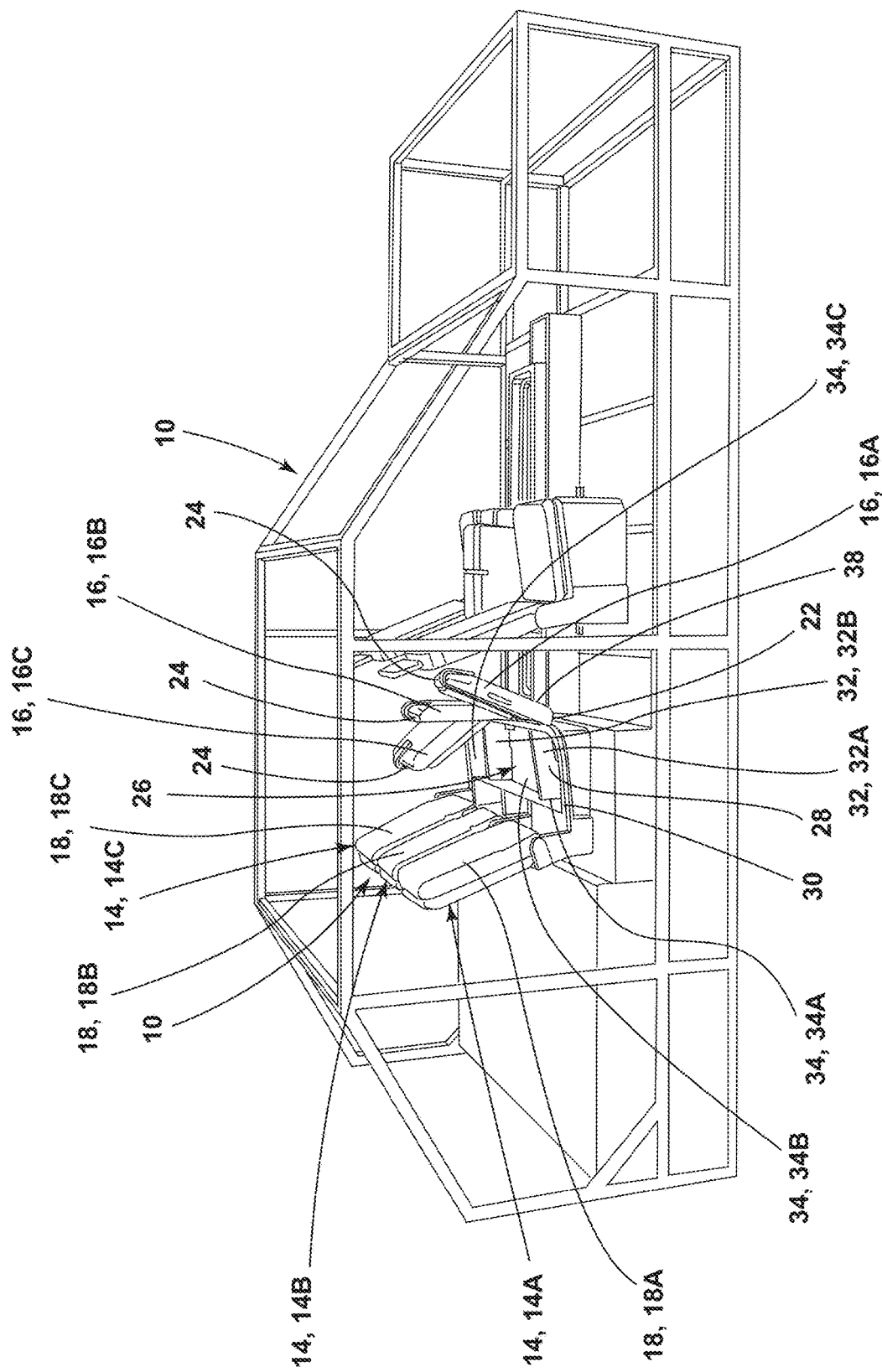
FIG. 1 is a perspective view of a vehicle, illustrating first, second, and third seat bases of first, second, and third seating assemblies pivoted to various positions, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a vehicle 10 includes a seating system 12. The seating system 12 includes a first seating assembly 14A having a first seat base 16A that is operable to pivot between a use position and a pivoted position. A second seating assembly 14B is adjacent to the first seating assembly 14A and includes a second seat base 16B that is operable to pivot between a use position and a pivoted position. A third seating assembly 14C is adjacent to the second seating assembly 14B, such that the second seating assembly 14B is positioned between the first and third seating assemblies 14A, 14C. The third seating assembly 14C includes a third seat base 16C that is operable to pivot between a use position and a pivoted position. A first connector 36A is coupled to at least one of the first seat base 16A and the second seat base 16B. The first connector 36A is operable between an engaged condition, wherein the first connector 36A couples the first and second seat bases 16A, 16B, such that movement of the first seat base 16A from the use position to the pivoted position causes the second seat base 16B to move from the use position to the pivoted position, and a disengaged condition, wherein the first seat base 16A is operable to move independently of the second seat 16B base between the use and pivoted positions. A second connector 36B is coupled to at least one of the second seat base 16B and the third seat base 16C. The second connector 36B is operable between an engaged condition, wherein the second connector 36B couples the second and third seat bases 16B, 16C, such that movement of the third seat base 16C from the use position to the pivoted position causes the second seat base 16B to move from the use position to the pivoted position, and a disengaged condition, wherein the third seat base 16C is operable to move independently of the second seat base 16B between the use and pivoted positions.

Referring now to FIGS. 1-3C, the seating system 12 may include a plurality of seating assemblies 14. For example, the seating system 12 may include the first seating assembly 14A and the second seating assembly 14B positioned adjacent to the first seating assembly 14A. In the embodiment illustrated in FIGS. 1-3C, the seating system 12 includes the first seating assembly 14A, the second seating assembly 14B adjacent to the first seating assembly 14A, and the third seating assembly 14C adjacent to the second seating assembly 14B, such that the second seating assembly 14B is disposed between the first seating assembly 14A and the third seating assembly 14C. Each of the plurality of seating assemblies 14 may include a seat base 16 and a corresponding seatback 18. The seat base 16 may include a forward end 22 and a rearward end 24 opposite the forward end 22. In the use position of the seat base 16, the forward end 22 may be vehicle-forward and/or seating assembly-forward of the rearward end 24.

The seatback 18 may be coupled to the seat base 16. In various embodiments, the seatback 18 may be coupled to the seat base 16 proximate to the rearward end 24 of the seat base 16. In some embodiments, each seating assembly 14 may include its own seat base 16 and/or seatback 18. For example, as illustrated in FIGS. 2A-2C, the first seating assembly 14A includes a first seatback 18A and a first seat base 16A, the second seating assembly 14B includes a second seatback 18B and a second seat base 16B, and the third seating assembly 14C includes a third seatback 18C and a third seat base 16C. In some embodiments, one or more of the plurality of seating assemblies 14 may share a seatback 18 and/or a seat base 16 with another of the plurality of seating assemblies 14. For example, as illustrated in FIGS. 3A-3C, the seatback 18 of the first and second seating assemblies 14A, 14B is configured as a single body that is coupled to the first and second seat bases 16A, 16B of the first and second seating assemblies 14A, 14B and is configured to provide a backrest for an occupant seated on the first seat base 16A as well as an occupant seated on the second seat base 16B.

Referring still to FIGS. 1-3C, in various embodiments, the seat base 16 of each seating assembly 14 may be operable to pivot between the use position and the pivoted position about a pivot axis 20. In some embodiments, the seat base 16 may be configured to pivot seating assembly-forward and/or vehicle-forward from the use position to the pivoted position. For example, as illustrated in FIGS. 2A and 2B, the first seat base 16A of the first seating assembly 14A pivots vehicle-forward from the use position (FIG. 2A) to the pivoted position (FIG. 2B) about a first pivot axis 20A that is proximate to the forward end 22 of the first seat base 16A. As illustrated in FIG. 2C, the second and third seat bases 16B, 16C of the second and third seating assemblies 14B, 14C, respectively, likewise pivot from use positions (FIG. 2A) to pivoted positions (FIG. 2C) about second and third pivot axes 20B, 20C that are respectively disposed proximate to the forward ends 22 of the second and third seat bases 16B, 16C. In various examples, the pivot axes 20 about which the plurality of seat bases 16 pivot between the use and pivoted positions may be substantially collinear with each other. In other words, the pivot axes 20 may be substantially aligned with each other to generally form a common axis. For example, in the embodiment illustrated in FIGS. 4A-4C, the first, second, and third pivot axes 20A, 20B, 20C are substantially collinear, such that the first, second, and third seat bases 16A, 16B, 16C may pivot together as a unit, as described further herein.

As illustrated in FIGS. 3A-3C, in some embodiments, the seat base 16 of each of the plurality of seating assemblies 14 may pivot seating assembly-rearward and/or vehicle-rearward from the use position to the pivoted position. For example, as illustrated in FIGS. 3A and 3B, the first seat base 16A of the first seating assembly 14A may pivot from the use position (FIG. 3A) to the pivoted position (FIG. 3B) about the first pivot axis 20A, which is disposed proximate to the rearward end 24 of the first seat base 16A. As illustrated in FIG. 3C, the second and third seat bases 16B, 16C may also pivot seating assembly-rearward and/or vehicle-rearward from the use position to the pivoted position about second and third pivot axes 20B, 20C, respectively, disposed at the rearward ends 24 of the second and third seat bases 16B, 16C. In some implementations, the seat bases 16 of the plurality of seating assemblies 14 may pivot seating assembly-rearward and/or vehicle-rearward from the use position to the pivoted position by pivoting relative to the corresponding seatbacks 18 of the plurality of seating assemblies 14. In other words, in some examples, the seat bases 16 may be pivotably coupled to the seatbacks 18 of the seating assemblies 14. In the embodiment illustrated in FIGS. 3A-3C, the first, second, and third pivot axes 20A, 20B, 20C are disposed proximate to the rearward ends 24 of the first, second, and third seat bases 16A, 16B, 16C, respectively, and are substantially collinear to each other.

In various embodiments, a storage receptacle 26 may be disposed vehicle-downward of at least one of the plurality of seat bases 16 in the seating system 12. For example, as illustrated in FIGS. 2B and 3B, the storage receptacle 26 is disposed vehicle-downward of the first seat base 16A, and movement of the first seat base 16A from the use position to the pivoted position provides access to the storage receptacle 26 via an upper opening 28 that may be covered by the first seat base 16A when the first seat base 16A is in the use position, as illustrated in FIGS. 2A and 3A. In various embodiments, the storage receptacle 26 may extend beneath a plurality of the seat bases 16 in the seating system 12. For example, as illustrated in FIGS. 2C and 3C, the storage receptacle 26 extends beneath the first, second, and third seat bases 16A, 16B, 16C. As such, movement of the first seat base 16A, the second seat base 16B, the third seat base 16C, and/or a combination thereof from the use position to the pivoted position may provide access to the storage receptacle 26. In some embodiments, the seat bases 16 of the plurality of seating assemblies 14 in the seating system 12 may be pivotably coupled to the storage receptacle 26. For example, in the embodiment illustrated in FIGS. 2A-2C, the first, second, and third seat bases 16A, 16B, 16C are pivotably coupled to an upper rim 30 of the storage receptacle 26 proximate to the forward ends 22 of the first, second, and third seat bases 16A, 16B, 16C.

As illustrated in FIGS. 2C and 3C, in various embodiments, the storage receptacle 26 may include one or more dividers 32 configured to segment the storage receptacle 26 into generally distinct storage areas 34. In some examples, the dividers 32 may correspond with gaps between adjacent seat bases 16 while in the use positions. For example, as illustrated in FIG. 3C, a first divider 32A may be positioned generally between the first and second seat bases 16A, 16B and a second divider 32B may be positioned generally between the second and third seat bases 16B, 16C to define a first storage area 34A vehicle-downward of the first seat base 16A, a second storage area 34B vehicle-downward of the second seat base 16B, and a third storage area 34C vehicle-downward of the third seat base 16C. In such embodiments, the first, second, and/or third storage areas 34A, 34B, 34C may be accessed individually by individually pivoting the corresponding seat base 16 to the pivoted position. In various implementations, the one or more dividers 32 may be removable, such that the storage receptacle 26 may be used to store larger items that extend beneath multiple seat bases 16 within the storage receptacle 26.

Referring still to FIGS. 1-3C, in various embodiments, the seat bases 16 of the plurality of seating assemblies 14 in the seating system 12 may be operable between interdependent and independent conditions. In the independent conditions, adjacent seat bases 16 may be operable to pivot between the use and pivoted positions independently of each other. For example, when the first and second seat bases 16A, 16B are in the independent conditions, the first seat base 16A may be operable to move between the use and pivoted positions independently of the second seat base 16B, as illustrated in FIGS. 2B and 3B, wherein the first seat base 16A is in the pivoted position and the second seat base 16B is in the use position. In the interdependent conditions, adjacent seat bases 16 may be configured to move together between the use and pivoted positions. For example, if the first seat base 16A and the second seat base 16B are in the interdependent conditions, movement of the first seat base 16A between the use and pivoted positions causes the second seat base 16B to move between the use and pivoted positions. Likewise, in the interdependent conditions, movement of the second seat base 16B from the use position to the pivoted position may cause the first seat base 16A to move from the use position to the pivoted position.

In the embodiment illustrated in FIGS. 2A-2C, examples of the independent condition and the interdependent condition of certain seat bases 16 are illustrated. In FIG. 2B, the first seat base 16A is in the independent condition relative to the second seat base 16B, such that the first seat base 16A may pivot between the use and pivoted positions, while the second seat base 16B remains in the use position, as shown. In FIG. 2C, the first, second, and third seat bases 16A, 16B, 16C are in the interdependent conditions. In other words, movement of the first seat base 16A, the second seat base 16B, and/or the third seat base 16C between the use and pivoted positions causes the other seat bases 16 to, likewise, move between the use and pivoted positions. It is contemplated that a variety of features may be utilized to prompt the seat bases 16 of the plurality of seating assemblies 14 to enter the interdependent conditions and the independent conditions. For example, as described further herein, in some embodiments, one or more connectors 36 may be configured to interconnect the plurality of seat bases 16 selectively, such that the independent and interdependent conditions may be achieved.

Referring now to FIGS. 4A-5C, in various embodiments, at least one connector 36 may be coupled to one or more of the seat bases 16. In some embodiments, the at least one connector 36 may be coupled to at least one of the first seat base 16A and the second seat base 16B and may be operable between engaged and disengaged conditions. In the engaged condition, the at least one connector 36 may couple the first and second seat bases 16A, 16B, such that movement of the first seat base 16A from the use position to the pivoted position causes the second seat base 16B to move from the use position to the pivoted position. In the disengaged condition, the at least one connector 36 may be disengaged, such that the first seat base 16A is operable to move independently of the second seat base 16B between the use and pivoted positions. In other words, the at least one connector 36 may be coupled to at least one of the first seat base 16A and the second seat base 16B and operable between an engaged condition, wherein the at least one connector 36 couples the first and second seat bases 16A, 16B, such that the first and second seat bases 16A, 16B are in the interdependent conditions, and a disengaged condition, wherein the first and second seat bases 16A, 16B are in the independent conditions relative to each other.

Figure 4A:
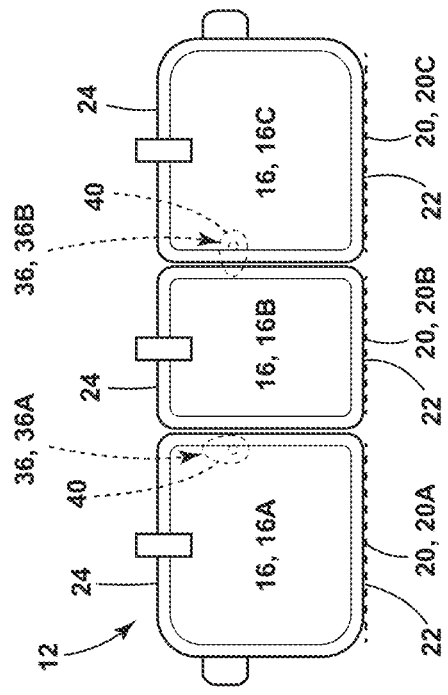
FIG. 4A is a top view of the first, second, and third seat bases, illustrating first and second connectors in disengaged conditions, according to one embodiment.
Figure 4B:
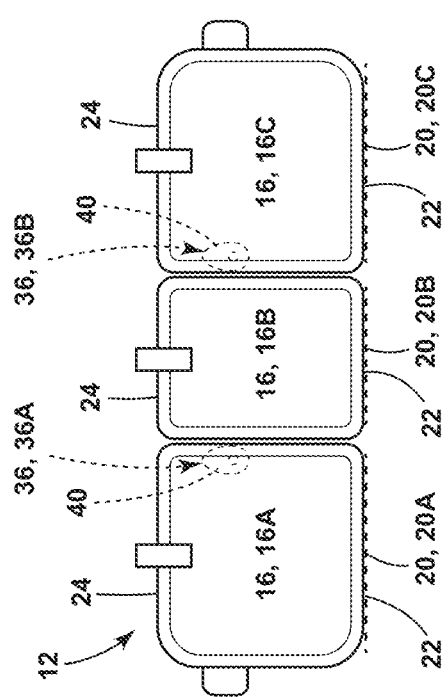
FIG. 4B is a top view of the first, second, and third seat bases, illustrating the first connector in an engaged condition and the second connector in the disengaged condition, according to one embodiment.
Figure 4C:
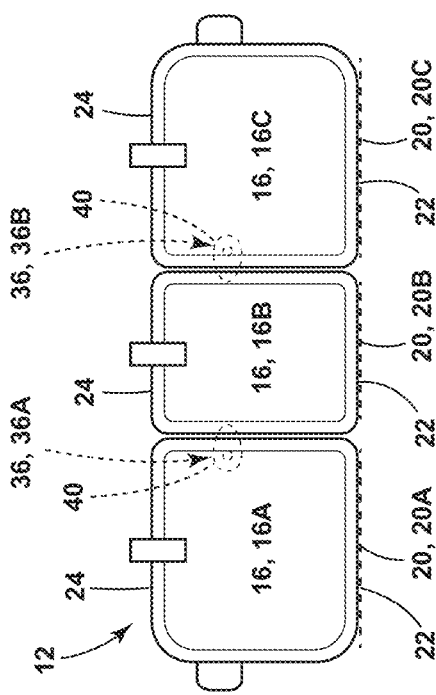
FIG. 4C is a top view of the first, second, and third seat bases, illustrating the first and second connectors in the engaged conditions, according to one embodiment.

In various embodiments, the seating system 12 may include a plurality of connectors 36. For example, as illustrated in FIGS. 4A-4C, a first connector 36A is coupled to the first seating assembly 14A and a second connector 36B is coupled to the third seating assembly 14C. Although illustrated in FIGS. 4A-4C as being coupled to the first and third seat bases 16A, 16C, respectively, it is contemplated that the first connector 36A may be coupled to at least one of the first and second seat bases 16A, 16B and the second connector 36B may be coupled to at least one of the second and third seat bases 16B, 16C, in some embodiments. The first and second connectors 36A, 36B are illustrated in the disengaged conditions in FIG. 4A. As illustrated, the first and second connectors 36A, 36B are not engaged with the second seat base 16B while in the disengaged conditions, respectively. The first and second connectors 36A, 36B are illustrated in the engaged conditions in FIG. 4C. As shown, the first and second connectors 36A, 36B are engaged with the second seat base 16B while in the engaged conditions, respectively. In the engaged condition of the first and second connectors 36A, 36B, the first connector 36A couples the first seat base 16A to the second seat base 16B, and the second connector 36B couples the third seat base 16C to the second seat base 16B, such that movement of any one of the first, second, or third seat bases 16A, 16B, 16C between the use and pivoted positions causes the other connected seat bases 16 to move as well (i.e., the first, second, and third seat bases 16A, 16B, 16C are in the interdependent conditions).

As illustrated in FIG. 4A, in the disengaged conditions, the first and second connectors 36A, 36B do not couple the first and third seat bases 16A, 16C with the second seat base 16B, such that each of the first, second, and third seat bases 16A, 16B, 16C are operable to pivot between the use and pivoted positions independently of each other (i.e., the first, second, and third seat bases 16A, 16B, 16C are in the independent conditions). In various implementations, one of the first and second connectors 36A, 36B may be in the engaged condition while the other is in the disengaged condition, as shown in FIG. 4B. This configuration allows two of the seat bases 16 to be coupled with each other and move together between the use and pivoted positions, while the other seat base 16 is operable to move independently of the two coupled seat bases 16.

In some embodiments, the at least one connector 36 may be pivotably coupled to at least one seat base 16 and may be configured to be pivoted between the engaged condition and the disengaged condition. In some implementations, the at least one connector 36 may be pivotably coupled to an underside 38 of the at least one seat base 16. In other words, the at least one connector 36 may be coupled to the side of the seat base 16 opposite the side of the seat base 16 that an occupant sits upon. For example, in the embodiment illustrated in FIGS. 4A-4C, the first and second connectors 36A, 36B include pivotable tabs 40 coupled to the undersides 38 of the first and third seat bases 16A, 16C, respectively. The pivotable tabs 40 are configured to be manually pivoted relative to the first and third seat bases 16A, 16C, respectively, between the disengaged condition, as illustrated in FIG. 4A, and the engaged condition, as illustrated in FIG. 4C. It is contemplated that the at least one connector 36 may be at least one of a variety of features configured to selectively couple adjacent seat bases 16 to each other (e.g., latch, corresponding male and female engagement features, magnets, etc.).

Figure 5A:
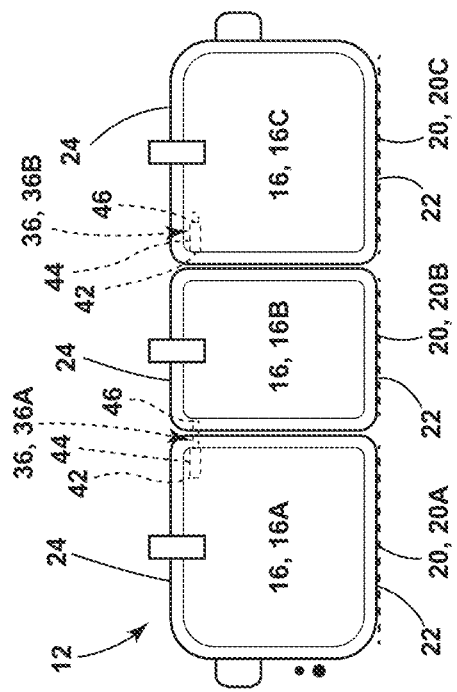
FIG. 5A is a top view of the first, second, and third seat bases, illustrating input features, first and second actuators, and the first and second connectors in the disengaged conditions, according to one embodiment.
Figure 5B:
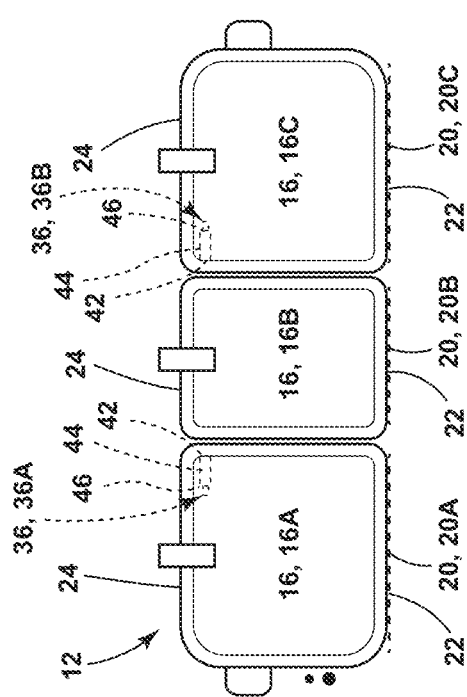
FIG. 5B is a top view of the first, second, and third seat bases, illustrating the input features, the first and second actuators, and the first connector in the engaged condition and the second connector in the disengaged condition, according to one embodiment.
Figure 5C:
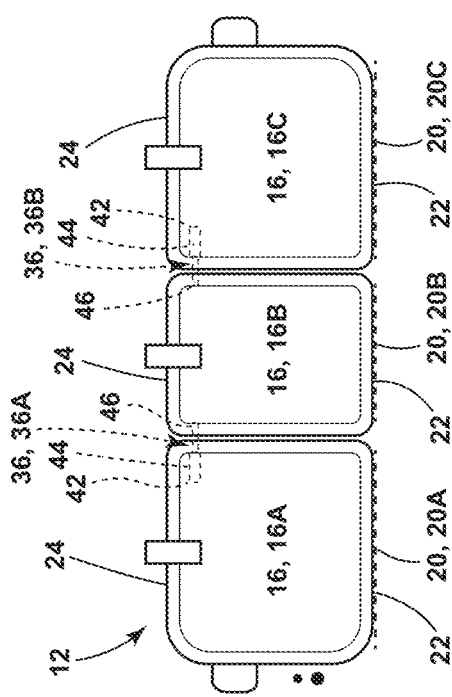
FIG. 5C is a top view of the first, second, and third seat bases, illustrating the input features, the first and second actuators, and the first and second connectors in the engaged conditions, according to one embodiment.

Referring now to FIGS. 5A-5C, at least one actuator 42 may be coupled to the at least one connector 36 and configured to actuate to move the at least one connector 36 to the engaged condition and/or the disengaged condition. As illustrated in FIGS. 5A-5C, in various embodiments, a first actuator 42A may be coupled to the first connector 36A and a second actuator 42B may be coupled to the second connector 36B. In some embodiments, the actuator 42 may be a mechanical actuator, such as a latch that actuates when one or more cables coupled to the latch are tensioned sufficiently. A variety of mechanical actuators are contemplated. In some embodiments, the actuator 42 may be an electromechanical actuator that is configured to actuate in response to an electrical signal. For example, the actuator 42 may be a solenoid coil 44 and the connector 36 may be a ferromagnetic plunger 46 configured to be actuated between the engaged condition and the disengaged condition via energization of the solenoid coil 44. A variety of electromechanical actuators 42 are contemplated.

Figure 6:
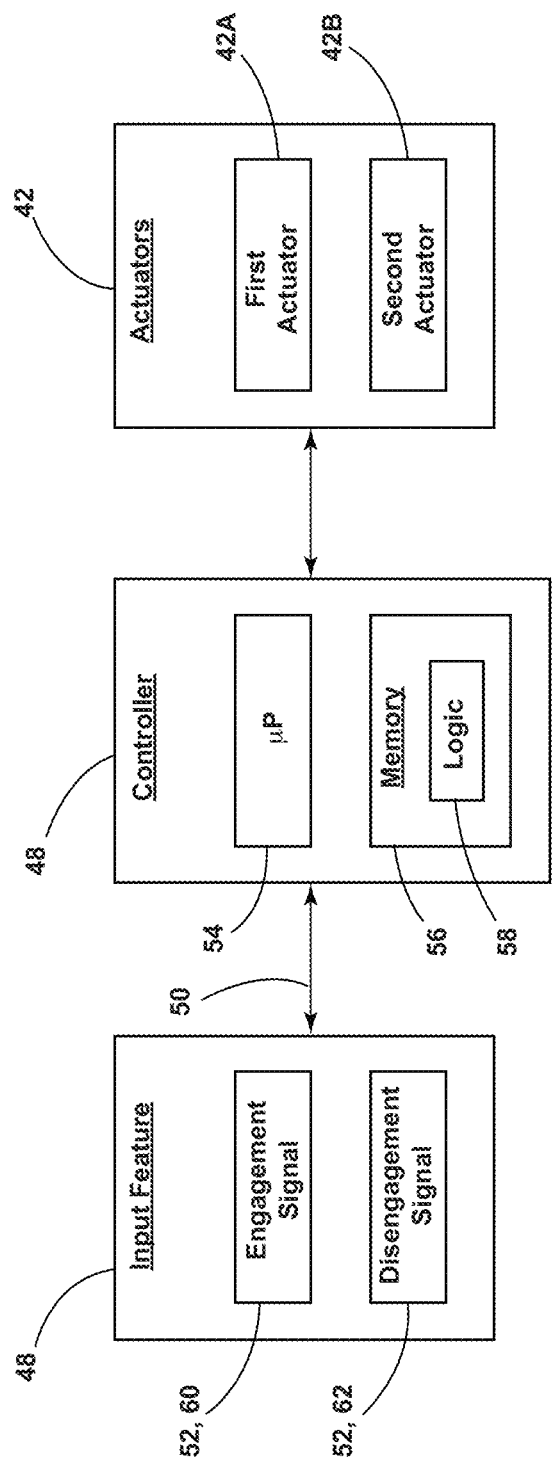
FIG. 6 is a block diagram, illustrating the controller, the input feature, and the actuators, according to one embodiment.

Referring now to FIGS. 5A-6, in various embodiments, the actuator 42 may be electrically coupled to a controller 48 and/or an input feature 50. The controller 48 may be configured to receive an input 52 from the input feature 50 and prompt the actuator 42 to move the at least one connector 36 to the engaged condition and/or the disengaged condition based on the received input 52. The controller 48 may be configured to receive various inputs 52 and control various outputs. The controller 48 may be a shared or dedicated controller 48 that includes a microprocessor 54 and memory 56, as illustrated in FIG. 6, according to various embodiments. It should be appreciated that the controller 48 may include control circuitry, such as analog and/or digital control circuitry. Stored within the memory 56 and executed by the microprocessor 54 is logic 58 for processing the various inputs 52 and controlling the various outputs described herein.

The inputs 52 to the controller 48 may include engagement signals 60 and disengagement signals 62. The controller 48 may be configured to prompt operation of the actuator 42 in response to the engagement signal 60 to move the at least one connector 36 to the engaged condition. Further, the controller 48 may be configured to prompt operation of the actuator 42 to move the at least one connector 36 to the disengaged condition in response to the disengagement signal 62. As illustrated in FIGS. 5A-5C, in some embodiments, the controller 48 may receive engagement signals 60 and disengagement signals 62 from one or more input features 50 that prompt the controller 48 to control the first actuator 42A and/or the second actuator 42B to move the first and/or second connectors 36A, 36B between the engaged and/or disengaged conditions. In some embodiments, the inputs 52 may be made available from another controller 48 via a vehicle data communication line or shared bus.

As discussed, the controller 48 may receive inputs 52 from the one or more input features 50. In various embodiments, the one or more input features 50 may include one or more switches. For example, as illustrated in FIGS. 5A-5C, two input features 50 configured as mechanical switches coupled to the side of the first seat base 16A are illustrated. A variety of types of switches are contemplated (proximity, capacitive, mechanical, etc.) The controller 48 may be configured to prompt actuation of the actuator 42 to move the at least one connector 36 into the engaged condition and/or the disengaged condition in response to inputs 52 received from the one or more input features 50. Thus, a user may manipulate the input feature 50 to move the at least one connector 36 between the engaged condition and the disengaged condition, such that the seat bases 16 in the seating system 12 may pivot interdependently as a unit or pivot independently of each other.

In operation of an exemplary embodiment, the first, second, and third seat bases 16A, 16B, 16C may, initially, be in the interdependent conditions, such that movement of the first seat base 16A from the use position to the pivoted position causes the second and third seat bases 16B, 16C to move from the use positions to the pivoted positions. In this configuration, the user would ordinarily be able to access the portion of the storage receptacle 26 under the first seat base 16A by pivoting the first, second, and third seat bases 16A, 16B, 16C together from the use positions to the pivoted positions; however, passengers seated in the second and third seating assemblies 14B, 14C prevent movement of the second and third seat bases 16B, 16C from the use positions to the pivoted positions. As a result, the first seat base 16A is also prevented from moving to the pivoted position, as the first seat base 16A is coupled to the second seat base 16B in the interdependent condition.

The user, desiring to access the portion of the storage receptacle 26 beneath the first seat base 16A without asking the passengers to leave the second and third seating assemblies 14B, 14C, engages the input feature 50 to prompt the actuator 42 to move the first connector 36A from the engaged condition to the disengaged condition. With the first connector 36A in the disengaged condition, the first seat base 16A is free to independently move from the use position to the pivoted position while the second and third seat bases 16B, 16C remain in the use positions. The user pivots the first seat base 16A to the pivoted position and accesses the portion of the storage receptacle 26 beneath the first seat base 16A.

The present disclosure may provide a variety of advantages. First, while in the engaged condition, the at least one connector 36 may allow a user to move multiple seat bases 16 between the use and pivoted positions by applying a force to only one of the interconnected seat bases 16. Second, while in the independent conditions, the seat bases 16 may be operable to pivot between the use and pivoted positions independently of adjacent seat bases 16, which may allow for particularized access to certain portions of the storage receptacle 26. Third, the placement of the input feature 50 on the side of one or more of the seat bases 16 may allow a user to switch the seat bases 16 between the interdependent conditions and the independent conditions from a single convenient position within or from outside of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating system, comprising:
    a first seating assembly having a first seat base operable to pivot between a use position and a pivoted position;
    a second seating assembly adjacent to the first seating assembly and having a second seat base operable to pivot between a use position and a pivoted position;
    a connector coupled to at least one of the first seat base and the second seat base and operable between an engaged condition, wherein the connector couples the first and second seat bases, such that movement of the first seat base from the use position to the pivoted position causes the second seat base to move from the use position to the pivoted position, and a disengaged condition, wherein the first seat base is operable to move independently of the second seat base between the use and pivoted positions;
    an actuator coupled to the connector; and
    control circuitry coupled to the actuator and configured to prompt actuation of the actuator in response to receiving an input from an input feature to move the connector to the engaged condition.

2. The vehicle seating system of claim 1, wherein the first seat base comprises:
    a rearward end that is proximate to a seatback of the first seating assembly in the use position of the first seat base; and
    a forward end opposite the rearward end, wherein the first seat base is configured to pivot between the use and pivoted positions about a pivot axis that is proximate to the forward end of the first seat base.

3. The vehicle seating system of claim 1, wherein the first seat base comprises:
    a rearward end that is proximate to a seatback of the first seating assembly; and
    a forward end opposite the rearward end, wherein the first seat base is configured to pivot between the use and pivoted positions about a pivot axis that is proximate to the rearward end of the first seat base.

4. The vehicle seating system of claim 1, wherein the connector is pivotably coupled to the first seat base and configured to be pivoted between the engaged condition and the disengaged condition.

5. The vehicle seating system of claim 1, further comprising:
    a storage receptacle disposed vehicle-downward of the first seat base, wherein movement of the first seat base from the use position to the pivoted position provides access to the storage receptacle.

6. The vehicle seating system of claim 5, wherein the storage receptacle extends beneath the second seat base, such that movement of the second seat base from the use position to the pivoted position provides access to the storage receptacle.

7. A vehicle seating system, comprising:
    a first seating assembly having a first seat base operable to pivot between a use position and a pivoted position;
    a second seating assembly adjacent to the first seating assembly and having a second seat base operable to pivot between a use position and a pivoted position;
    a third seating assembly adjacent to the second seating assembly, such that the second seating assembly is positioned between the first and third seating assemblies, the third seating assembly having a third seat base operable to pivot between a use position and a pivoted position;
    a first connector coupled to at least one of the first seat base and the second seat base and operable between an engaged condition, wherein the first connector couples the first and second seat bases, such that movement of the first seat base from the use position to the pivoted position causes the second seat base to move from the use position to the pivoted position, and a disengaged condition, wherein the first seat base is operable to move independently of the second seat base between the use and pivoted positions;
    a second connector coupled to at least one of the second seat base and the third seat base and operable between an engaged condition, wherein the second connector couples the second and third seat bases, such that movement of the third seat base from the use position to the pivoted position causes the second seat base to move from the use position to the pivoted position, and a disengaged condition, wherein the third seat base is operable to move independently of the second seat base between the use and pivoted positions;

at least one actuator coupled to the first and second connectors; and control circuitry coupled to the at least one actuator and configured to prompt actuation of the at least one actuator in response to receiving at least one input from at least one input feature to move at least one of the first connector and the second connector to the engaged condition.

8. The vehicle seating system of claim 7, wherein the first, second, and third seat bases are configured to pivot about first, second, and third pivot axes, respectively, wherein the first, second, and third pivot axes are substantially collinear.

9. The vehicle seating system of claim 8, wherein the first seat base comprises:

a rearward end that is proximate to a seatback of the first seating assembly in the use position of the first seat base; and a forward end opposite the rearward end, wherein the first pivot axis is proximate to the forward end of the first seat base, such that the first seat base is configured to pivot vehicle-forward from the use position to the pivoted position.

10. The vehicle seating system of claim 8, wherein the first seat base comprises:

a rearward end that is proximate to a seatback of the first seating assembly; and a forward end opposite the rearward end, wherein the first pivot axis is proximate to the rearward end of the first seat base, such that first seat base is configured to pivot vehicle-rearward from the use position to the pivoted position.

11. The vehicle seating system of claim 8, wherein the first connector is pivotably coupled to an underside of the first seat base and configured to be pivoted between the engaged condition and the disengaged condition.

12. The vehicle seating system of claim 8, wherein the second connector is pivotably coupled to an underside of the second seat base and configured to be pivoted between the engaged condition and the disengaged condition.

13. The vehicle seating system of claim 8, further comprising:

a storage receptacle disposed vehicle-downward of the first seat base, wherein movement of the first seat base from the use position to the pivoted position provides access to the storage receptacle.

14. The vehicle seating system of claim 13, wherein the storage receptacle extends beneath the second and third seat bases, such that movement of the second seat base from the use position to the pivoted position provides access to the storage receptacle, and movement of the third seat base from the use position to the pivoted position provides access to the storage receptacle.

* * * * *